Figure 1:
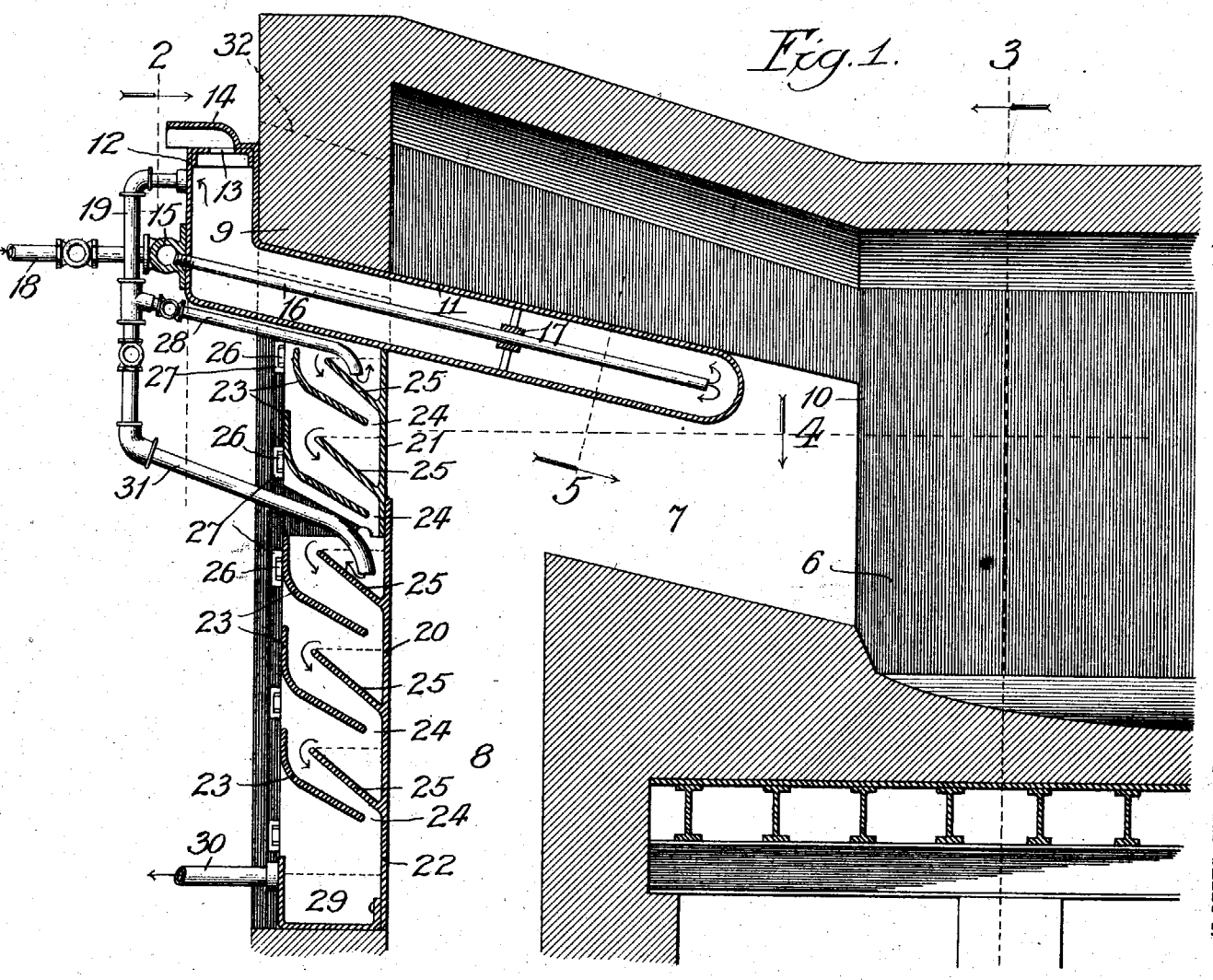

T. S. BLAIR, Jr.

FURNACE.

APPLICATION FILED FEB. 8, 1909.

Reissued Apr. 13, 1909.

12,939.

4 SHEETS—SHEET 1.

Witnesses:

John Enders

Chas. H. Bull

Inventor:

Thomas S. Blair Jr.

By Dyrenforth, Lee, Chritton & Wilder

Attys.

T. S. BLAIR, Jr.

FURNACE.

APPLICATION FILED FEB. 8, 1909.

Reissued Apr. 13, 1909.

12,939.

4 SHEETS—SHEET 2.

Witnesses:

John Enders

Chas. H. Buell

Inventor:

Thomas S. Blair Jr.

By Dyrenforth, Lee, Christon & Wiles

Attys.

T. S. BLAIR, Jr.

FURNACE.

APPLICATION FILED FEB. 8, 1909.

Reissued Apr. 13, 1909.

12,939.

4 SHEETS—SHEET 3.

Witnesses:

John Enders

Chas. H. Bull.

Inventor:

Thomas S. Blair Jr.

By Dyrenforth, Lee, Christy & Wiles

Attys

T. S. BLAIR, Jr.
FURNACE.
APPLICATION FILED FEB. 8, 1909.
Reissued Apr. 13, 1909.
12,939.
4 SHEETS—SHEET 4.
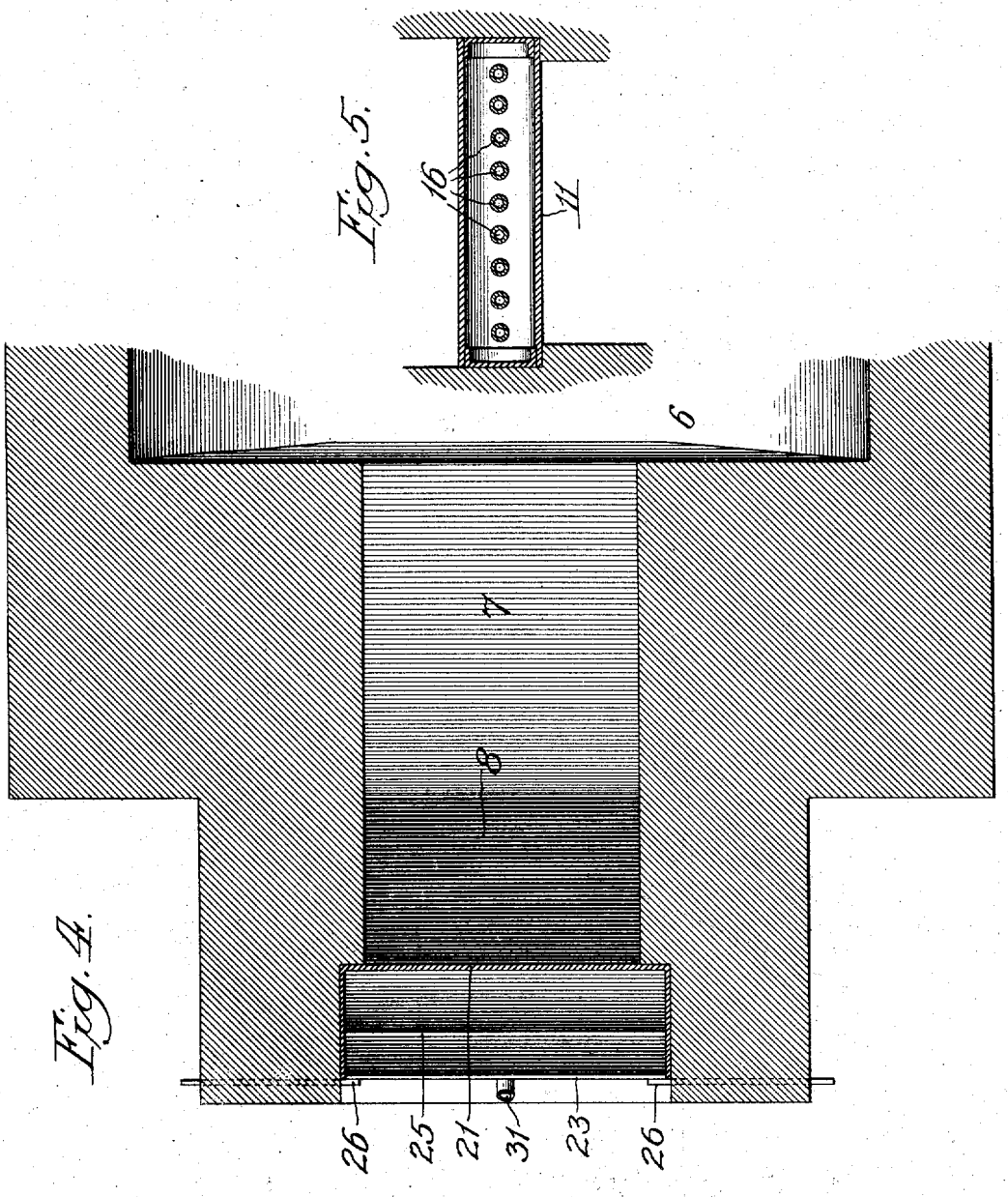
Witnesses:
John Enders
Chas. H. Buell
Inventor:
Thomas S. Blair Jr.,
By Dyrenforth, Lee, Chritton & Wilder
Attys

UNITED STATES PATENT OFFICE.

THOMAS S. BLAIR, JR., OF ELMHURST, ILLINOIS, ASSIGNOR TO THE BLAIR PORT COMPANY, OF NEW YORK, N. Y., A CORPORATION OF NEW YORK.

FURNACE.

No. 12,939. Specification of Reissued Letters Patent. Reissued April 13, 1909.

Original No. 869,616, dated October 29, 1907, Serial No. 369,411. Application for reissue filed February 8, 1909. Serial No. 476,859.

*To all whom it may concern:*

Be it known that I, THOMAS S. BLAIR, JR., a citizen of the United States, residing at Elmhurst, in the county of Dupage and State of Illinois, have invented a new and useful Improvement in Furnaces, of which the following is a specification.

My invention relates to improvements in the class of reverberatory furnaces of the regenerative type employed for melting or heating steel and known as an open-hearth furnace, when adapted for melting, and as a heating-furnace when adapted for heating blooms, billets and ingots.

In this class of furnace the intense heat to which the port-arch, of refractory brick, is subjected soon destroys it, and the same destructive influence is exerted on the rear brick wall of the gas-port; and the destruction of either of these features of the furnace necessarily throws it out of use pending repair and incurs very great consequent expense. So far as I am aware, no provision has hitherto been made for overcoming this destructive action on the aforesaid rear wall. I know it to be a common practice, however, to form the refractory arch of a length beyond that required to insure thorough combustion of the gases before they enter the furnace-chamber proper, to reverberate therein, thereby to add to the life of the arch by supplying an extension thereof to be worn away in a backward direction by the heat until the resultant shortening of the arch renders it unfit for its purpose; and it is furthermore the practice to provide under the forward-end portion of this extended section of the arch a system of water-circulating pipes to the end of counteracting the injurious effect upon it of the intense heat. The practice is not effective for the purpose, however, inasmuch as the point below the arch where the greatest intensity of heat of the burning gases is exerted is short of the extended section and of the water-pipes with which it is equipped, so that the heat, instead, as intended, of wearing away the arch from its forward end backward, soon breaks through it behind the pipes, thereby destroying it almost as soon as though it were unprovided with any means of protection. To overcome this tendency to arch-destruction, I substitute for the arch in the furnace a straight hood to extend over the port, forming it hollow of metal, and equip it with means for circulating water through it, which effectively protects it against injury from the heat; and to counteract the destructive tendency of the heat upon the rear wall of the port, I construct that wall of metal and provide means for flowing water over its outer surface, the supply of water for this last-named purpose being preferably the outflow from the hood.

Figure 2:
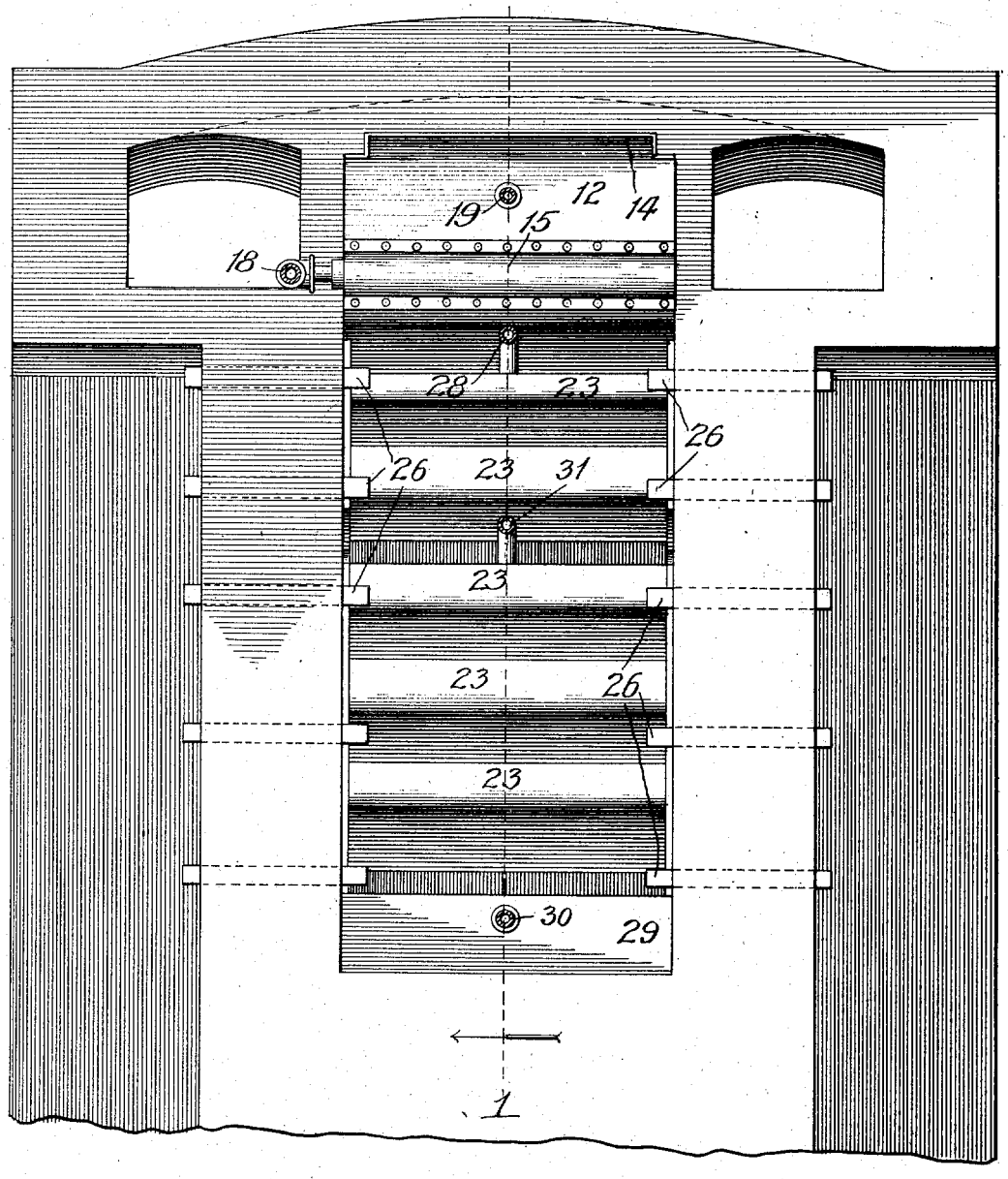
Figure 3:
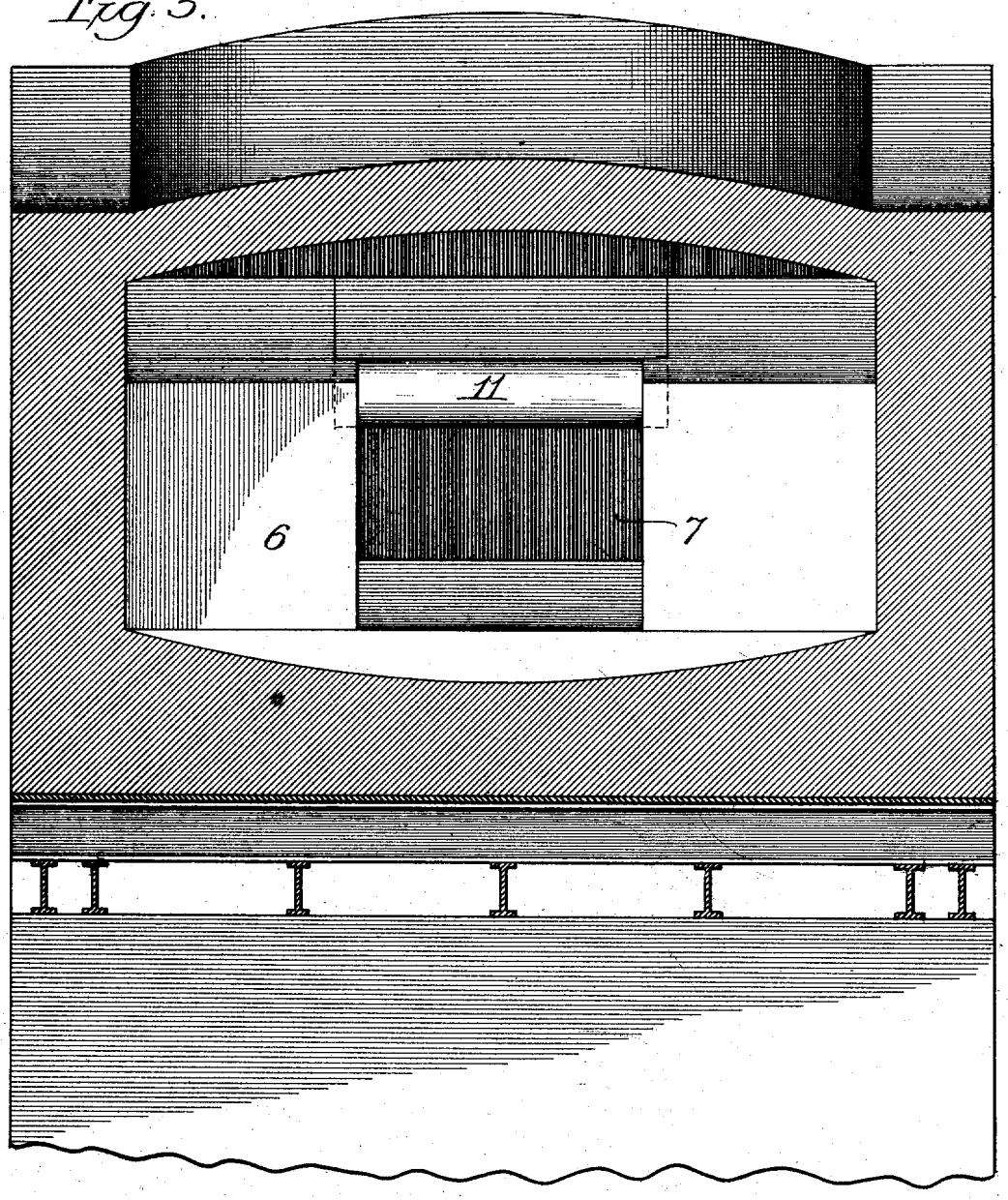

In the accompanying drawings Figure 1 is a longitudinal vertical section of one of the two similar port-containing end-portions of a furnace equipped with my improvements, the section being taken at the line 1 on Fig. 2 and viewed in the direction of the arrow; Fig. 2 is a view of the same in end-elevation partly sectional, the section being taken at the line 2 on Fig. 1 and viewed in the direction of the arrow; Fig. 3, a section taken at the line 3 on Fig. 1 and viewed in the direction of the arrow; Fig. 4, a section taken at the line 4 on Fig. 1 and viewed in the direction of the arrow, and Fig. 5, a section taken at the line 5 on Fig. 1 and viewed in the direction of the arrow.

The construction of the furnace, except as to the features constituting my improvements, may be the same in all particulars as that of the furnace of the same type in common use, so that there is no need of describing it in detail in the present case. In each end of the furnace-chamber 6 is formed the gas-port 7 leading from a vertical uptake-passage 8 which becomes the downtake-passage when the direction of the gases through the furnace is reversed, as will be understood by those skilled in the art. Through the end-wall 9 my improved device for covering the port 7, and which for lack of a better name I term a "hood", to distinguish it from the usual arch, but which performs every function of the latter, projects inclinedly into the furnace, wherein its inner end is supported by the wall-sections 10. This hood, denoted as 11, is a hollow metal body—preferably constructed of steel plate, similar to a boiler-shell, though it may be a casting of iron, steel or bronze—having flat top, bottom and sides with a rounded inner end, and formed with an upright chamber or head-section 12 on its outer end, which abuts against the inner surface of the wall 9. In the top of the head 12 is provided a vent-opening 13 covered by a shield 14 to tend to exclude foreign matter from entering the hood through the vent. On the head 12, near its base, is secured a manifold 15, from which a plurality of water-pipes 16 extend into the hood nearly to its inner end, wherein they discharge through their open ends, these pipes being supported by a spider 17 in the hood. A valved water-supply-pipe 18, leading from a suitable source (not shown) connects with one end of the header 15 to flow water from the latter, through the pipes 16 into the hood 11, through which it is caused to circulate by overflowing through a discharge-pipe 19 leading from the upper part of the chamber 12. By thus circulating water through the port-covering hood it is preserved against rapid destruction and when it is finally worn its removal and replacement by a perfect one are matters of comparative ease, requiring little time and therefore incurring only a short interruption in the operation in the furnace.

The port-wall 20, or "bulk-head", instead of being constructed of fire-brick, as usual, is formed of metal, preferably in two sections, as shown, the upper section 21 being narrower, vertically, than the lower section 22 to register with the port 7 and being adapted to be readily removed to permit access to the base of the port for truing up or repairing it, an operation requiring to be performed occasionally, and which is very arduous and expensive with the old construction of furnace, wherein the wall 20 is of brick, like the rest of the structure. Each section of the port-wall is a plate of channel-form, with its side-walls fitting between the brick-wall sections of the end of a furnace; and extending between these side-walls, and integral with or fastened to them, are troughs 23 in vertical series, extending from the outer edges of the side-walls, where they are upturned as shown, short of the backs of the channel-plates to leave discharge-openings 24 adjacent to said backs. With the troughs are provided alternate shelves 25, inclining upwardly from the back of each section of the wall 20 and extending between the sides thereof, to form water-receptacles adapted to overflow from one into the other through the troughs 23. These sections of the wall 20 are removably fastened in place, as by bars 26 caused to bear against the upturned ends of the troughs by being inserted through openings 27 formed horizontally through the end-wall sections of brick between which the sections of the metal wall fit and are confined.

Water is supplied to flow over the outer surface of the wall 20 by running the overflow from the hood 12 by way of the pipe 19 through a valved branch 28 to the section 21 to the uppermost receptacle-forming shelf 25, whence the overflow runs through the adjacent trough 23 filling the next lower receptacle from which it overflows, and so on down to the base of the wall 20, which is formed into a receptacle 29, whence the water discharges through a pipe 30 leading to a sewer or other desired point. Thus the water is caused to flow and be distributed over the outer surface of the metal wall, to counteract the injurious tendency of the heat in the furnace when the hot gases are directed against it in passing from the port 7 into the passage 8, then constituting the port-downtake. I also provide, by preference, another branch 31 of the pipe 19, to lead the water directly to the lower wall-section 22, to increase the flow, or rather to supply it to that section while the upper section may be removed temporarily, when the branch 28 would also be removed.

As is usual in furnaces of the class to which my invention relates, the air for commingling with the gases enters the furnace-chamber through openings 32 formed above the plane of the arch, or, in the present case, the hood 11 in the end-wall. For illustrating my invention it is only required to show one end-portion of the furnace; but, as will be understood, it is intended that the opposite end-portion shall be similarly constructed and equipped with my improvements. By the construction thus shown and described a practically indestructible port is provided. In an open-hearth melting furnace, the "blocks" or ends of the furnace, are built up—to the level at which, under the usual construction, the port-arches are placed—of silica brick in acid-lined furnaces, and of magnesite brick in basic furnaces. These "blocks" are covered with my water-cooled hoods, in place of the brick-arches, and they may be kept in shape permanently by throwing silica sand in an acid-furnace, and ground magnesite mixed with proper proportions of basic slag, in a basic furnace, against them from time to time during the operation of the furnace, in the same manner that the "breasts" or sides of the furnace-linings are now kept up in the common practice. My improvements not only render the ports of the furnace indestructible, but, by enabling the ports to be kept in their original condition, proper combustion of the gases is assured during the entire life of the furnace, and, consequently, greatly increased life is afforded to the roof and side-walls, any of which may be readily replaced when required during the usual burning out of the flues at the end of each week. This same statement of advantages applies equally to heating furnaces, which, however, are always acid-lined.

What I claim as new and desire to secure by Letters Patent is—

1. In a reverberatory regenerative furnace, the combination with a gas-port, of a hollow metal hood forming the entire port covering, and means for circulating water through said hood, for the purpose set forth.

2. In a reverberatory regenerative furnace, a hollow metal body projecting into the furnace from its end-wall to extend over the gas-port and be exposed directly to the heat of the furnace, and means for cooling said body, for the purpose set forth.

3. In a reverberatory regenerative furnace, a hollow metal body supported in the furnace-chamber to extend over and entirely cover the gas-port and provided with an outlet, and means for directing cooling water into the inner-end portion of said body to circulate through it, for the purpose set forth.

4. In a reverberatory regenerative furnace, a hollow metal hood projecting into the furnace from its end-wall to extend over the gas-port, and means for cooling said hood, for the purpose set forth.

5. In a reverberatory regenerative furnace, a hollow metal hood projecting into the furnace-chamber over the gas-port from its end-wall and extending to its side-walls, and means for cooling said hood, for the purpose set forth.

6. In a reverberatory regenerative furnace, a hollow metal hood inclining downwardly into the furnace from its end-wall to extend over the gas-port, and means for cooling said hood, for the purpose set forth.

7. In a reverberatory regenerative furnace, a hollow metal hood projecting into the furnace from its end-wall to extend over the gas-port and provided with an outlet, and means for directing a cooling-medium into the inner-end portion of the hood to circulate through it, for the purpose set forth.

8. In a reverberatory regenerative furnace, a hollow metal hood projecting into the furnace-chamber from its end-wall to extend over the gas-port and provided with an outlet, and a water-conducting pipe discharging into said hood, for the purpose set forth.

9. In a reverberatory regenerative furnace, a hollow metal hood projecting into the furnace-chamber from its end-wall to extend over the gas-port and provided with an outlet, and a water-conducting pipe discharging into the inner-end portion of the hood, for the purpose set forth.

10. In a reverberatory regenerative furnace, a hollow metal hood projecting into the furnace-chamber from its end-wall to extend over the gas-port and provided with a water-outlet, and a water-conducting pipe discharging into the inner-end portion of the hood for circulating cooling-water through the same to said outlet, for the purpose set forth.

11. In a reverberatory regenerative furnace, a hollow metal hood projecting into the furnace-chamber from its end-wall to extend over the gas-port and provided with a water-outlet in its rear portion, and water-conducting pipes discharging into the inner-end portion of the hood for circulating cooling-water through the same to said outlet, for the purpose set forth.

12. In a reverberatory regenerative furnace, the combination with the gas-port, of a hollow metal hood forming the entire port covering, said hood being provided with a water-outlet in its end, and a water-conducting pipe extending within said hood and discharging at its inner end therein, for the purpose set forth.

13. In a reverberatory regenerative furnace, the combination with the gas-port, of a hollow metal hood forming the entire port covering, said hood being provided at its outer end with a chamber-forming head having a discharge outlet, a manifold having a water-supply pipe connected with it, and water-pipes extending from the manifold in the hood and discharging therein, for the purpose set forth.

14. In a reverberatory regenerative furnace, the combination with the gas-port, of a hollow metal hood forming the entire port covering, said hood extending through the end-wall of the structure into and supported in the furnace-chamber and provided at its outer end with a chamber-forming vented head having a discharge-outlet, a manifold on said head having a water-supply pipe connected with it, and water-pipes extending from the manifold lengthwise into the hood nearly to and discharging into its inner end, for the purpose set forth.

15. In a reverberatory regenerative furnace, the combination with the gas-port, of the adjacent portion of the end-wall of the structure formed of metal and provided with means for flowing water over its outer surface and operating to protect said wall against the effect of the heat of the outgoing products of combustion, for the purpose set forth.

16. In a reverberatory regenerative furnace, the combination with the gas-port and the downtake-passage communicating therewith, of the end-wall covering said port and passage, formed of metal and provided with means for flowing water over its outer surface and operating to protect said end-wall against the effect of the heat of the out-going products of combustion, for the purpose set forth.

17. In a reverberatory regenerative furnace, the combination with the gas-port and the down-take passage communicating therewith, of the end-wall covering said port and passage, formed of upper and lower metal sections and provided with means for flowing water over its outer surface and operating to protect said end wall against the effect of the heat of the outgoing products of combustion, for the purpose set forth.

18. In a reverberatory regenerative furnace, the combination with the gas-port and the downtake-passage communicating therewith, of the end-wall covering said port and passage, formed of metal and provided on its outer surface with water-distributing means, and means for flowing water over said surface and operating to protect said end wall against the effect of the heat of the outgoing products of combustion, for the purpose set forth.

19. In a reverberatory regenerative furnace, the combination with the gas-port and the downtake-passage communicating therewith, of the end-wall covering said port and passage, formed of metal in channel-shape and fitting and confined between brick-sections of the end-wall of the structure, said wall having series of water receptacles and troughs on its outer surface, and means for flowing water over said surface through said troughs and receptacles and operating to protect said walls against the effect of the heat of the outgoing products of combustion, for the purpose set forth.

20. In a reverberatory regenerative furnace, the combination with the gas-port and the downtake-passage communicating therewith, of the end-wall covering said port and passage, formed of metal and provided on its outer surface with water-distributing means, said covering operating to protect said wall against the effect of the heat of the outgoing products of combustion, a hollow metal hood forming the entire port covering extending through the end-wall of the structure above said metal wall into and supported in the furnace chamber and having a water-outlet in its outer end and a water-conducting pipe in and discharging within it, and a discharge-pipe leading from said outlet to said water-distributing means on the metal wall, for the purpose set forth.

THOMAS S. BLAIR, Jr.

In presence of—
A. U. Thorien,
R. A. Schaefer.